US007083376B2

(12) United States Patent
Crofton et al.

(10) Patent No.: US 7,083,376 B2
(45) Date of Patent: Aug. 1, 2006

(54) AUTOMATED MERGE NEST FOR PAIRS OF MAGNETIC STORAGE DISKS

(75) Inventors: Walter Crofton, Castro Valley, CA (US); David Newman, Fremont, CA (US); Nghia Ta, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/434,546

(22) Filed: May 9, 2003

(65) Prior Publication Data

US 2004/0071535 A1    Apr. 15, 2004

Related U.S. Application Data

(60) Provisional application No. 60/417,631, filed on Oct. 10, 2002.

(51) Int. Cl.
*B65G 65/00*    (2006.01)

(52) U.S. Cl. .................. 414/811; 414/404; 414/416.02; 414/416.09; 414/416.12

(58) Field of Classification Search ................ 414/404, 414/416.02, 416.08, 416.09, 416.12, 811
See application file for complete search history.

(56) References Cited

U.S. PATENT DOCUMENTS

| 3,382,647 | A |   | 5/1968  | Davey et al. |
| 3,505,777 | A |   | 4/1970  | Tsutsumi ................. 53/168 |
| 4,573,851 | A | * | 3/1986  | Butler ..................... 414/404 |
| 4,669,612 | A |   | 6/1987  | Mortensen ............... 206/454 |
| 4,676,008 | A |   | 6/1987  | Armstrong ................ 34/237 |
| 4,694,778 | A |   | 9/1987  | Learn et al. ............. 118/728 |
| 4,695,217 | A | * | 9/1987  | Lau ........................ 414/404 |
| 4,724,963 | A |   | 2/1988  | Mortensen ............... 206/454 |
| 4,768,328 | A |   | 9/1988  | Mims ...................... 53/532 |
| 4,808,456 | A |   | 2/1989  | Yamada et al. |
| 4,819,579 | A |   | 4/1989  | Jenkins ................... 118/728 |
| 4,840,530 | A | * | 6/1989  | Nguyen ................... 414/404 |
| 4,856,957 | A | * | 8/1989  | Lau et al. ................ 414/404 |
| 4,947,624 | A |   | 8/1990  | Cones, Sr. et al. ........ 53/540 |
| 4,947,784 | A | * | 8/1990  | Nishi ..................... 414/404 |
| 4,949,848 | A |   | 8/1990  | Kos ....................... 211/41 |
| 4,958,982 | A | * | 9/1990  | Champet et al. ......... 414/751.1 |
| 4,962,879 | A |   | 10/1990 | Goesele et al. ........... 228/116 |
| 4,981,222 | A |   | 1/1991  | Lee ....................... 211/41 |
| 4,987,407 | A | * | 1/1991  | Lee ....................... 340/540 |
| 5,007,788 | A | * | 4/1991  | Asano et al. ........... 414/416.09 |
| 5,111,936 | A |   | 5/1992  | Kos ....................... 206/334 |

(Continued)

FOREIGN PATENT DOCUMENTS

EP        0 177 073        8/1985

(Continued)

OTHER PUBLICATIONS

Australian Written Opinion and Search Report, Dec. 17, 2004, Singapore Application No. SG200302857-8.

(Continued)

*Primary Examiner*—James W. Keenan
(74) *Attorney, Agent, or Firm*—Sheridan Ross P.C.

(57) ABSTRACT

Various methods and apparatus for handling a plurality of disks and repositioning them into pairs is provided. In one embodiment, a nest is configured to hold a cassette and includes a nest. The nest includes a curved surface with ribs or teeth extending therefrom which define a row of grooves. The grooves are dimensioned to hold a pair of disks in concentric contact merge orientation and the teeth facilitate movement of pairs of disks into the grooves.

38 Claims, 7 Drawing Sheets

U.S. PATENT DOCUMENTS

| | | | | |
|---|---|---|---|---|
| 5,125,784 A | * | 6/1992 | Asano | 414/404 |
| 5,188,499 A | * | 2/1993 | Tarng et al. | 414/404 |
| 5,314,107 A | * | 5/1994 | d'Aragona et al. | 228/116 |
| 5,348,151 A | | 9/1994 | Dressen | 206/334 |
| 5,430,992 A | | 7/1995 | Olson | 53/399 |
| 5,476,176 A | | 12/1995 | Gregerson et al. | 206/711 |
| 5,478,622 A | | 12/1995 | Nakamura et al. | |
| 5,486,134 A | | 1/1996 | Jones et al. | 451/209 |
| 5,497,085 A | | 3/1996 | Tian et al. | |
| 5,620,295 A | * | 4/1997 | Nishi | 414/416.11 |
| 5,664,407 A | | 9/1997 | Cooper, III et al. | 53/542 |
| 5,780,127 A | | 7/1998 | Mikkelsen | 428/35.7 |
| 5,820,449 A | | 10/1998 | Clover | 451/287 |
| 5,906,469 A | | 5/1999 | Oka et al. | 414/416 |
| 5,926,352 A | | 7/1999 | Murayama et al. | |
| 5,956,317 A | | 9/1999 | Komiyama et al. | 369/286 |
| 5,976,255 A | | 11/1999 | Takaki et al. | 118/500 |
| 6,007,896 A | | 12/1999 | Bhushan | |
| 6,033,522 A | | 3/2000 | Iwata et al. | 156/345 |
| 6,107,599 A | | 8/2000 | Baumgart et al. | 219/121.77 |
| 6,182,814 B1 | | 2/2001 | Koehler | 198/418.7 |
| 6,345,947 B1 | * | 2/2002 | Egashira | 414/225.01 |
| 6,354,794 B1 | | 3/2002 | Sato et al. | 414/811 |
| 6,368,040 B1 | | 4/2002 | Yamasaki et al. | 414/222 |
| 6,457,929 B1 | | 10/2002 | Sato et al. | 414/404 |
| 6,582,279 B1 | | 6/2003 | Fox et al. | 451/37 |
| 6,612,801 B1 | * | 9/2003 | Koguchi | 414/416.02 |
| 6,626,744 B1 | | 9/2003 | White et al. | 451/66 |
| 2002/0006324 A1 | * | 1/2002 | Sato et al. | 414/416.12 |
| 2002/0081181 A1 | * | 6/2002 | Yokomori et al. | 414/416.02 |
| 2003/0179692 A1 | | 9/2003 | Ohotomo | |
| 2003/0208899 A1 | | 11/2003 | Grow et al. | 29/458 |
| 2003/0209389 A1 | | 11/2003 | Buitron et al. | 184/6 |
| 2003/0209421 A1 | | 11/2003 | Buitron et al. | 204/192.2 |
| 2003/0210498 A1 | | 11/2003 | Kim et al. | 360/135 |
| 2003/0211275 A1 | | 11/2003 | Buitron et al. | 428/64.1 |
| 2003/0211361 A1 | | 11/2003 | Kim et al. | 428/694 R |
| 2004/0013011 A1 | | 1/2004 | Valeri | 365/200 |
| 2004/0016214 A1 | | 1/2004 | Buitron | 53/474 |
| 2004/0035737 A1 | | 2/2004 | Buitron et al. | 206/454 |
| 2004/0068862 A1 | | 4/2004 | Buitron et al. | 29/604 |
| 2004/0069662 A1 | | 4/2004 | Buitron et al. | 206/307.1 |
| 2004/0070092 A1 | | 4/2004 | Buitron et al. | 264/1.33 |
| 2004/0070859 A1 | | 4/2004 | Crofton et al. | 360/1 |

FOREIGN PATENT DOCUMENTS

| | | | | |
|---|---|---|---|---|
| EP | 0 192 244 | | 2/1986 | |
| EP | 768704 | * | 4/1997 | 414/416.02 |
| JP | 631225727 | | 5/1988 | |
| JP | 04067333 | | 3/1992 | |
| JP | 05028533 | | 2/1993 | |
| JP | 06076384 | | 3/1994 | |
| JP | 7-263521 | * | 10/1995 | 414/416.02 |
| JP | 07296418 | | 11/1995 | |
| JP | 08249802 | | 9/1996 | |
| JP | 08273210 | | 10/1996 | |
| JP | 10228674 | | 8/1998 | |
| JP | 11265506 | | 9/1999 | |
| JP | 20011232667 | | 8/2001 | |
| WO | WO 9836867 A1 | | 8/1998 | |

OTHER PUBLICATIONS

Mar. 12, 2005 Invitiation to Respond to Written Opinion from Intellectual Property Office of Singapore to Tan Jinhwee, Eunice & Lim Chooeng.

"Design of an active memory system for network applications", Asthana, A.; Cravatts, M.; Krzyzanowski, P.; Memory Technology, Design and Testing, Aug. 8-9, 1994; p.: 58-63.

Tsinberg, M. Eggrs, C., "DVD technology"; Image Processing, 1998 ICIP 98 Proceedings, 1998 Int'l Conf on vol. 1; 4-7 Oct. 1998, p. 2: 2 vol. 1.

US 5,762,201, 06/1998, Whalen (withdrawn)

* cited by examiner

AUTOMATED MERGE NEST FOR PAIRS OF MAGNETIC STORAGE DISKS

CROSS REFERENCE TO RELATED APPLICATION

Priority is claimed from U.S. Provisional Patent Application Serial No. 60/417,631 filed Oct. 10, 2002, which is incorporated by reference herein in its entirety.

The subject matter of the present application is related to the following applications, each of which has a filing date of May 9, 2003: U.S. patent application Ser. No. 10/434,550 entitled "Single-Sided Sputtered Magnetic Recording Disks" in the name of Clasara et al. (Publication No. US-2003-0211361-A1); U.S. patent application Ser. No. 10/435,361 entitled "Dual Disk Transport Mechanism Processing Two Disks Tilted Toward Each Other" in the name of Grow et al. (Publication No. US-2003-0208899-A1); U.S. patent application Ser. No. 10/435,358 entitled "Information-Storage Media With Dissimilar Outer Diameter and/or Inner Diameter Chamfer Designs On Two Sides" in the name of Clasara et al. (Publication No. US-2003-0210498-A1); U.S. patent application Ser. No. 10/435,360 entitled "Method of Merging Two Disks Concentrically Without Gap Between Disks" in the name of Buitron (Publication No. US-2004-0016214-A1); U.S. patent application Ser. No. 10/434,551 entitled "Apparatus for Combining or Separating Disk Pairs Simultaneously" in the name of Buitron et al. (Publication No. US-2004-0035737-A1); U.S. patent application Ser. No. 10/435,572 entitled "Method of Simultaneous Two-Disk Processing of Single-Sided Magnetic Recording Disks" in the name of Buitron et al. (Publication No. US-2003-0211275-A1); U.S. patent application Ser. No. 10/435,161 entitled "W-Patterned Tools for Transporting/Handling Pairs of Disks" in the name of Buitron et al. (Publication No. US-2003-0209421-A1); U.S. patent application Ser. No. 10/435,295 entitled "Method for Servo Pattern Application on Single-Side Processed Disks in a Merged State" in the name of Valeri (Publication No. US-2004-0013011-A1); U.S. patent application Ser. No. 10/434,547 entitled "Method for Simultaneous Two-Disk Texturing" in the name of Buitron et al. (Publication No. US-2004-0070092-A1); U.S. patent application Ser. No. 10/535,227 entitled "Cassette for Holding Disks of Multiple Form Factors" in the name of Buitron et al. (Publication No. US-2004-0069662-A1); U.S. patent application Ser. No. 10/435,293 entitled "Apparatus for Simultaneous Two-Disk Scrubbing and Washing" in the name of Crofton et al. (Publication No. US-2004-0070859-A1); U.S. patent application Ser. No. 10/435,362 entitled "Cassette Apparatus for Holding 25 Pairs of Disks for Manufacturing Process" in the name of Buitron et al. (Publication No. US-2004-0068862-A1); and U.S. patent application Ser. No. 10/434,540 entitled "Method of Lubricating Multiple Magnetic Storage Disks in Close Proximity" in the name of Crofton et al. (Publication No. US-2003-0209389-A1). Each of these applications is incorporated by reference in its entirety as if stated herein. All of these applications are commonly owned by the Assignee.

FIELD OF THE INVENTION

The present invention is a method and apparatus for handling a plurality of disks and repositioning them into pairs of either gap merge or concentrically contact merge disks. It is most useful in the manufacture of single-sided hard memory disks.

BACKGROUND OF THE INVENTION

Hard disk drives are an efficient and cost effective solution for data storage. Depending upon the requirements of the particular application, a disk drive may include anywhere from one to eight hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

Typically, hard memory disks are produced with functional magnetic recording capabilities on both sides or surfaces of the disk. In conventional practice, these hard disks are produced by subjecting both sides of a raw material substrate disk, such as glass, aluminum or some other suitable material, to numerous manufacturing processes. Active materials are deposited on both sides of the substrate disk and both sides of the disk are subject to full processing such that both sides of the disk may be referred to as active or functional from a memory storage stand point. The end result is that both sides of the finished disk have the necessary materials and characteristics required to effect magnetic recording and provide data storage. These are generally referred to as double-sided process disks. Assuming both surfaces pass certification testing and have no defects, both sides of the disk may be referred to as active or functional for memory storage purposes. These disks are referred as double-sided test pass disks. Double-sided test pass disks may be used in a disk drive for double-sided recording.

Conventional double-sided processing of hard memory disks involves a number of discrete steps. Typically, twenty-five substrate disks are placed in a plastic cassette, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding, in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing. Washing is a multi-stage process and usually includes scrubbing of the disk surfaces. The textured substrate disks are then subjected to a drying process. Drying is performed on an entire cassette of disk drives at a time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied. The lubrication process can be accomplished by subjecting an entire cassette of disks to a liquid lubricant; it does not need to be done one disk at a time. Following lubrication, the disks are individually subjected to surface burnishing to remove asperities, enhance bonding of the lubricant to the disk surface and otherwise provide a generally uniform finish to the disk surface. Following burnishing, the disks are subjected to various types of testing. Examples of testing include glide testing to find and remove disks with asperities that could affect flying at the head/slider assembly and certification testing which is writing to and reading from the disk surfaces. Certification testing is also used to locate and remove disks with defects that make the surface unuseable for data storage. The finished disks can then be subjected to a servo-writing process and placed in disk drives, or placed in disk drives then subjected to servo-writing. The data zone texturing, laser zone texturing, scrubbing, sputtering, burnishing and testing processes are done one disk at a time, with each surface of a single disk being processed simultaneously.

Although the active materials and manufacturing processes, by their nature, are difficult and expensive to employ, over the years, the technology used to manufacture hard memory disks has rapidly progressed. As a result, the density of information that can be stored on a disk surface is remarkable. Indeed, double-sided test pass disks used in personal computers have much greater storage capacity than most consumers require during the useful life of the computer. Consumers thus are forced to pay substantial amounts for excess storage capacity and the components to access the excess storage capacity. This has caused some disk drive manufacturers, in some current applications, to manufacture and sell disk drives which utilize only one side of a double-sided test pass disk for storage purposes or which use the good side of a double-sided process disk where one surface passed certification testing and the second surface failed. In either case, the second surface, despite being fully processed, is unused. However, the disk drive manufacturer reduces its cost by eliminating the mechanical and electrical components needed to access the unused disk surface. These disk drives are referred to as single-side drives and are typically used in low-end or economy disk drives to appeal to the low cost end of the marketplace. Although this approach may reduce some cost, it does not reduce the wasted cost of manufacturing the unused storage surface of each disk. Thus, substantial savings can be achieved by not only manufacturing disks with a single active or functional side, but doing so in a cost-effective manner.

In contrast to a double-sided disk, a single-sided disk has only one functional memory surface with active recording materials. It is not a double-sided process disk where one side is not accessed or where one side has failed testing. Rather, manufacturing processes are applied in a controlled manner only to one side of the disk using unique single-sided processing techniques. In contrast to conventional double-sided disks, active recording materials are only applied to, and full processing is only conducted on, one side of the disk. Thus, substantial savings are achieved by eliminating processing the second side of each disk.

Figure 1:
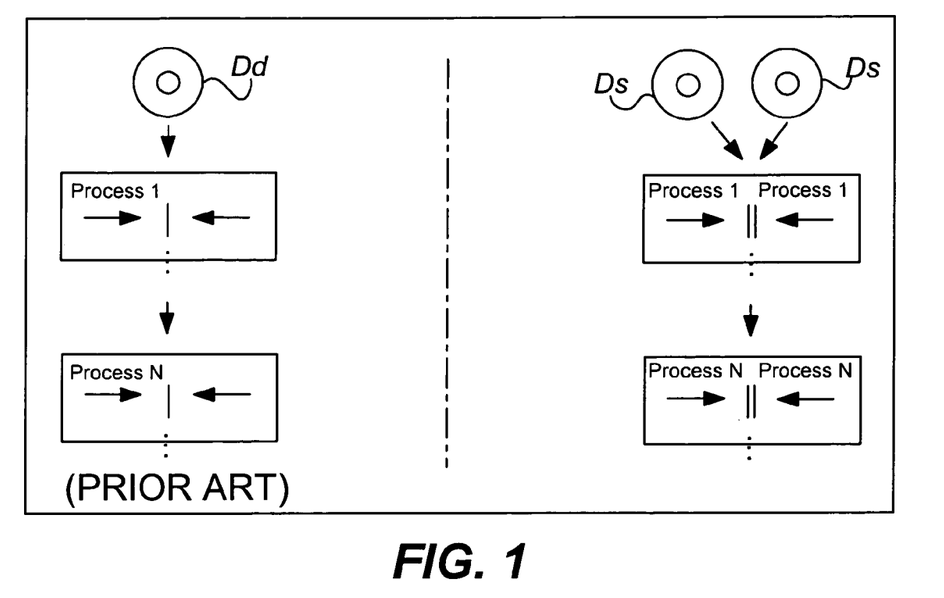
FIG. 1 is a schematic of a double-sided disk manufacturing process, on the left, and a schematic of a single-sided disk manufacturing process, on the right.

Additionally, the present invention achieves advantages by utilizing conventional double-sided disk manufacturing equipment and processes, with limited modification. The present invention enables simultaneous processing of two substrate disks through the same equipment and processes used to manufacture double-sided disks. Simultaneously processing two substrate disks results in the production of two single-sided disks in the same time and using essentially the same equipment as currently is used in the production of one double-sided disk. However, each single-sided disk has only a single active or functional surface. For illustrative purposes FIG. 1 shows a side-by-side schematic representation of the processing of one double-sided disk $D_d$, depicted on the left side of FIG. 1, versus the simultaneous processing of two single-sided disks $D_s$, depicted on the right side of FIG. 1. In each case, the double-sided disk or the two single-sided disks are subjected to the same process steps 1 through N, but the single-sided disk processing produces two disks in the same time the double-sided disk processing produces one disk.

A benefit provided by simultaneous single-sided processing of disks is a substantial cost savings achieved by eliminating the application of materials to and processing of one side of each disk. A further, and potentially significant cost savings can be achieved by utilizing existing double-sided disk processing equipment, with limited modification, to process pairs of single-sided disks. A still further benefit is a substantial increase in production (or reduction in processing time depending upon perspective). By utilizing existing double-sided disk processing equipment, approximately twice the productivity of a conventional double-sided production process is achieved (on the basis of numbers of disks produced) in the production of single-sided disks. Moreover, these increased productivity levels are achieved at approximately the same material cost, excepting the substrate disk, as producing half as many double-sided disks.

The simultaneous processing is achieved by combining two substrate disks together into a substrate disk pair or disk pair. A disk pair is two substrate disks that are oriented in a back-to-back relationship with the back-to-back surfaces either in direct physical contact or closely adjacent with a slight separation. The separation can be achieved with or without an intervening spacer. The substrate disk pair progresses through each process step in much the same way as one double-sided disk, but with only the outwardly facing surface of each disk in the pair being subjected to the full process. Thus, the outwardly facing surface of each pair becomes the active or functional surface and the inwardly facing surface of each pair remain inactive or non-functional.

For convenience and understanding, the following terms will have the definitions set forth:

a) "R-side" and "L-side" refer to the active side and inactive side of a disk, respectively. R-side is the side that does or will have active recording materials and memory capability. The R-side may also be referred to as the active or functional side. The L-side is the side that has little or no active recording materials or memory capabilities; it is non-functional or inactive from a data storage stand point.

b) "Merge" means to bring two disks closer together to form a pair of disks, a disk pair or a substrate pair.

c) "Demerge," conversely, means that a merged pair of disks is separated from each other.

d) "Disk" means a finished memory disk and all predecessor configurations during the manufacturing process starting with a substrate disk and progressing to a finished memory disk, depending upon the context of the sentence in which it is used.

e) "Disk pair" or "substrate pair" means two disks positioned in contact merge, gap merge or spacer merge orientation.

f) "Double-sided disk" means a single disk which has been subjected to double-sided processing, whether or not both sides of the disk have passed testing or only one side has passed testing.

g) "Gap merge" means a pair of disks that have been merged, but a space is maintained between the two merged disks. One or more spacers may or may not be used to maintain the gap or space. Gap merge includes both concentric and non-concentric merge. It should be understood that there is no precise dimension or limit to the space between the disks that causes them to be gap merged. Gap merge also includes the situation where the gap between the disks gradually decreases from one perimeter edge to the opposite perimeter edge of the disks when the two disks are angled toward each other. An example is when the bottom perimeter edges of the disks are spaced apart and the upper perimeter edges are in contact.

h) "Single-sided disks" means a single disk which has been subjected to single-side processing, where only one surface of the disk is fully processed.

i) "Spacer merge" means a spacer body is used to create spacing between two gap-merged disks.

j) "Contact merge" means a merged pair of disks where the inside surface of each disk is in contact with the inside surface of the other disk. Contact merge includes concentric and non-concentric merge.

k) "Concentric merge" means that two merged disks have the same axis and, assuming the two disks have the same outside diameter and inside diameter (as defined by the center aperture), their outer and inner perimeter edges are aligned.

l) "Concentric contact merge" means a pair of disks that are oriented in both a contact merge and a concentric merge.

m) "Non-concentric merge" or "off-centered merge" means the two merged disks are not concentric to each other or their perimeter edges are not aligned.

n) "Non-concentric contact merge" means the two contact merged disks are not concentric to each other or their perimeter edges are not aligned.

Figure 2:
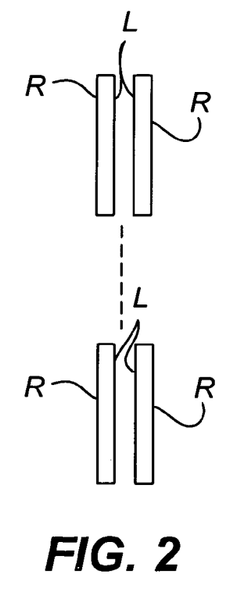
FIG. 2 is a cross-section of a pair of gap merge disks.
Figure 3:
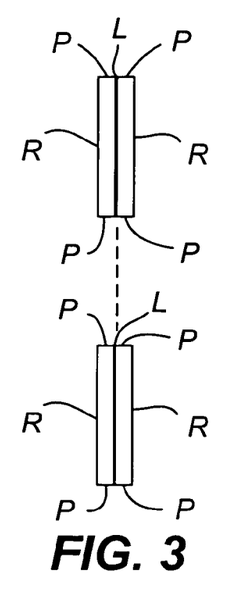
FIG. 3 is a cross-section of a pair of concentric contact merge disks.

Referring to FIG. 2, a cross-section of a pair of gap-merged disks is shown. The R-side (active or functional side) is the outwardly facing surface R of each disk within the pair. The L-side (inactive or nonfunctional side) is the inwardly facing surface L of each disk within the pair. In comparison, a cross-section of a pair of concentric contact merged disks is shown in FIG. 3. The relative orientation of the R-side and L-side of each disk remains the same, however, the L-side of each disk of the pair are in contact and the outer and inner perimeter P of each disk is aligned with the outer and inner perimeter P of the other disk.

Figure 4:
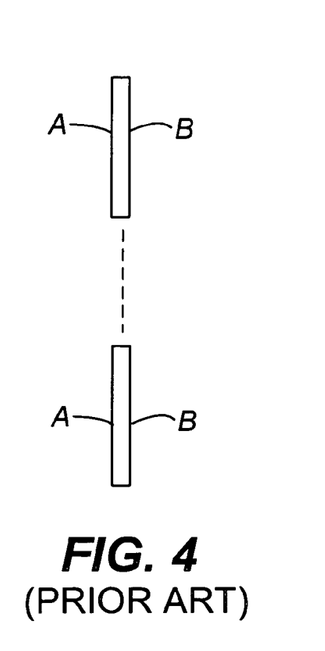
FIG. 4 is a cross-section of a conventional double-sided process disk.

A conventional double-sided disk is shown in FIG. 4. The left side surface is referred to as the "A" side and the right side surface is referred to as the "B" side. Both the A and B sides are subjected to processing, including the addition of active or magnetic materials. In contrast, with reference to FIGS. 2 and 3, the R-side of each disk in a pair of disks is oriented on the outside of the pair and is subjected to processing in the same fashion as the A and B sides of a double-sided disk. Conversely, the L-side of each disk in a pair of disks is oriented on the inside of the pair and is not subjected to full processing in the same fashion as the A and B sides of a double-sided disk.

When repositioning a pair of disks into a concentric contact merge orientation, it is possible for the pair of disks to merge non-concentrically. Regardless of how it happens, once merged non-concentrically, it is difficult for the pair of disks to continue through the manufacturing process. For example, if non-concentrically merged, neither the outer edges nor the center aperture of the disks are aligned. It is therefore difficult, if not impossible, to securely engage the disks by the outer edge or central aperture by mechanical means because these edges are not aligned. One or both disks may come loose. For example, it may be desirable to engage a pair of disks at their central aperture with a spindle assembly in order to spin the pair of disks for texturing. If the center apertures are not concentrically aligned, the spindle may only engage a portion of each disk, but not enough of both disks to properly secure them. As a result, during spinning the disks may come loose or may wobble, thereby negatively effecting the texturing process. Similar adverse effects can occur during scrubbing, testing or servo writing. In such circumstances, it may be necessary to remove the pair of disks from the manufacturing process and scrap them. This not only lowers the production yield but, depending upon where in the manufacturing process it occurs, it can cause a portion of the process to be shut down while the disks are removed. Because of the requisite, and in some cases extreme, cleanliness of disk manufacturing processes, intervention to address the problem can also compromise the quality of the other disks in the same processing batch.

Similarly, non-concentric contact merge can occur during transfer of disks into a cassette. Premature contact between adjacent disks can occur at a time when the disks are misaligned, causing the disks to adhere in a non-concentric contact merge orientation. Such a situation can occur following lubrication, for example, due to the capillary effect created between disks as the lubricant drains away. In any case, non-concentrically merged disks cannot usually be separated without compromising the quality of the disks or the cleanliness of the process where the problem occurs.

SUMMARY OF THE INVENTION

These and other needs are addressed by the various embodiments and configurations of the present invention. The present invention is generally directed to a disk merging station for merging pairs of disks into concentric contact merge orientation. The merging station includes a cassette platform for engaging a disk cassette having an open center and open top, and U-shaped end walls for access to disks housed in the cassette. The merging station further includes a nest or multi-disk merging saddle disposed at the center of the cassette platform. In one embodiment, the nest is fixed in place, and in a second embodiment, the nest may be movable between a first retracted position beneath the cassette and a second extended position where it is disposed within the open body of the cassette. If the nest is in a fixed position, it would be located at least slightly above the open bottom of the cassette and, preferably, within the open cavity of the disk cassette.

In operation, the merging station will facilitate merging of disk pairs. As one example, the present invention will assist the transfer of disks from a mandrel to a cassette where the transfer includes changing the orientation of the disks from a spaced orientation on the mandrel to a contact merge orientation in the cassette. As the mandrel lowers the disks down through the open top of the cassette, the bottom perimeter edges of the disks will engage the nest prior to the lateral edges of the disks engaging alignment ribs formed on the inside walls of the cassette. The nest is configured with at least one row of parallel grooves or channels separated by raised ribs on each inside surface of the opposed side walls. Each rib is further defined by a center ridge. The ridges of adjacent ribs are aligned with the predetermined spacing of disks on the mandrel such that two disks are positioned between adjacent ridges. The side walls of each rib are angled toward the grooves such that, as the mandrel lowers the disks, the bottom perimeter edges of the disks contact the angled surfaces of the ribs and force pairs of disks together, removing the gap between the ribs and placing the disk pair in a concentric contact merge orientation. At this point, the nest may be lowered until the disks are fully engaged by the ribs formed in the side wall of the cassette. The cassette ribs are similarly configured in a contact merge orientation and are aligned with the ribs on the nest. When the cassette is fully engaging the disks, the pairs of disks will be generally in concentric contact merge orientation. Alternatively, if the nest is fixed in position in the open cavity of the cassette, when the cassette is raised off of the merge nest, the ribs formed in the side walls of the cassette fully engage the disk pairs, causing them to conform to a contact merge orientation. In either situation, the separating movement of the nest and cassette as the disks disengage the nest cause the individual pairs of disks to be fully positioned in a concentric contact merge orientation due to the configuration of the ribs in the side walls of the cassette.

It should be appreciated that the present invention is not limited to placing disks in a contact merge orientation. Rather, the present invention can be used in any situation in which it is desired to merge pairs of disks. Thus, the merge station may be used to place pairs of disks in a gap merge orientation or to change the spacing in disk pairs that are already in a gap merge orientation. The invention thereby can substantially reduce the likelihood that disk pairs will become misaligned or will be non-concentrically contact merged when transferred to a cassette. This will result in a higher disk yield and less interruption of the manufacturing processes.

The above-described embodiments and configurations are neither complete nor exhaustive. As will be appreciated, other embodiments of the invention are possible utilizing, alone or in combination, one or more the features set forth above or described in detail below.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

Figure 5:
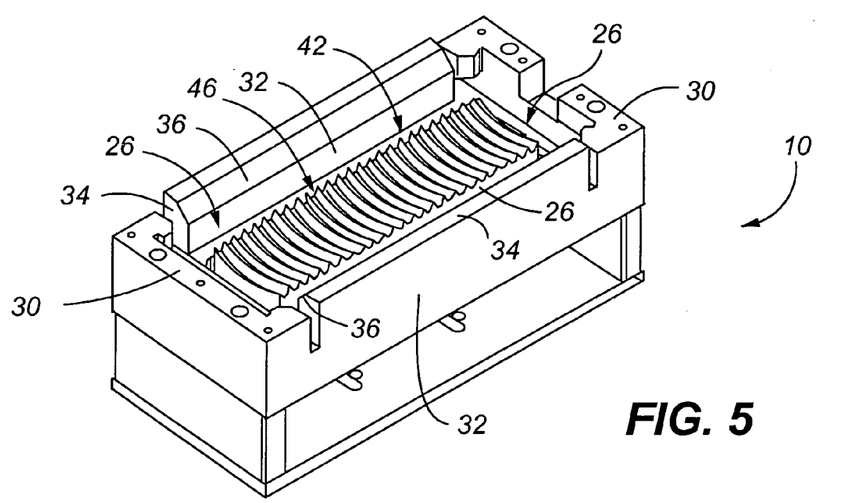
FIG. 5 is a perspective view of the merging station of the present invention.
Figure 6:
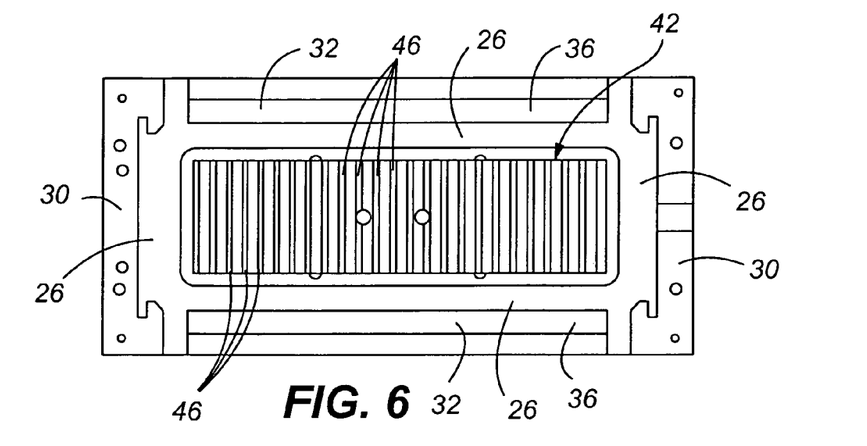
FIG. 6 is a top plan view of the merge station of the present invention.
Figure 7:
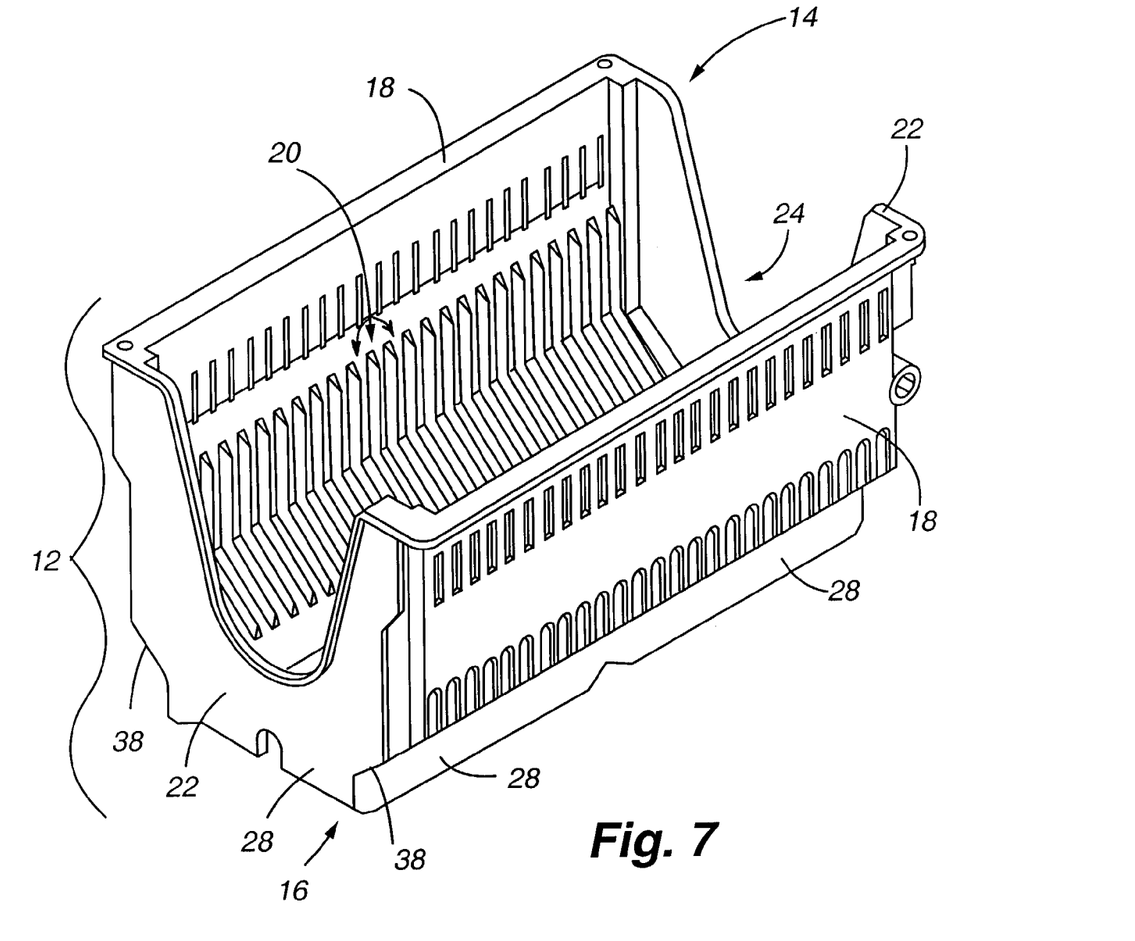
FIG. 7 is a perspective view of a disk cassette configured to position disks in a concentric contact merge orientation.

Turning to FIGS. 5 and 6, a cassette platform or merging station 10 is shown. The platform is configured to receive a disk cassette or disk carrier 12. As shown in FIG. 6, disk cassettes typically have an open top 14 and open bottom 16, two side walls 18 with grooves or channels 20 for holding a plurality of disks in a parallel axial alignment and a pair of end walls 22 with U-shaped openings 24 for accessing the disks. The platform 10 has a generally rectangular channel 26 into which the bottom portions 28 of the cassette side walls 18 and end walls 22 are seated. The outer end walls 30 and side walls 32 of the platform support the cassette. In addition, the platform side walls may include elevated portions 34 configured, for example, with a beveled or sloped portion 36, to match the configuration of the exterior side walls 18 of the cassette and to provide added stability during processing operations.

Figure 9:
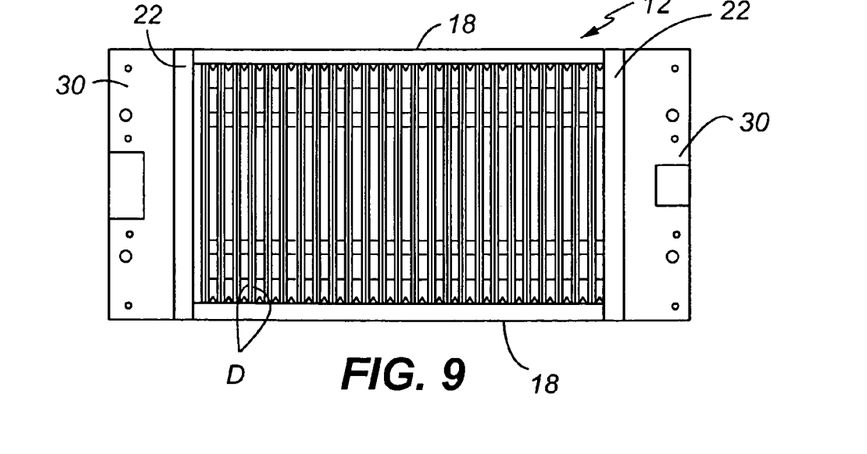
FIG. 9 is a perspective view of a merge station of the present invention with a contact merge cassette loaded with disks mounted thereon.
Figures 11, 12:
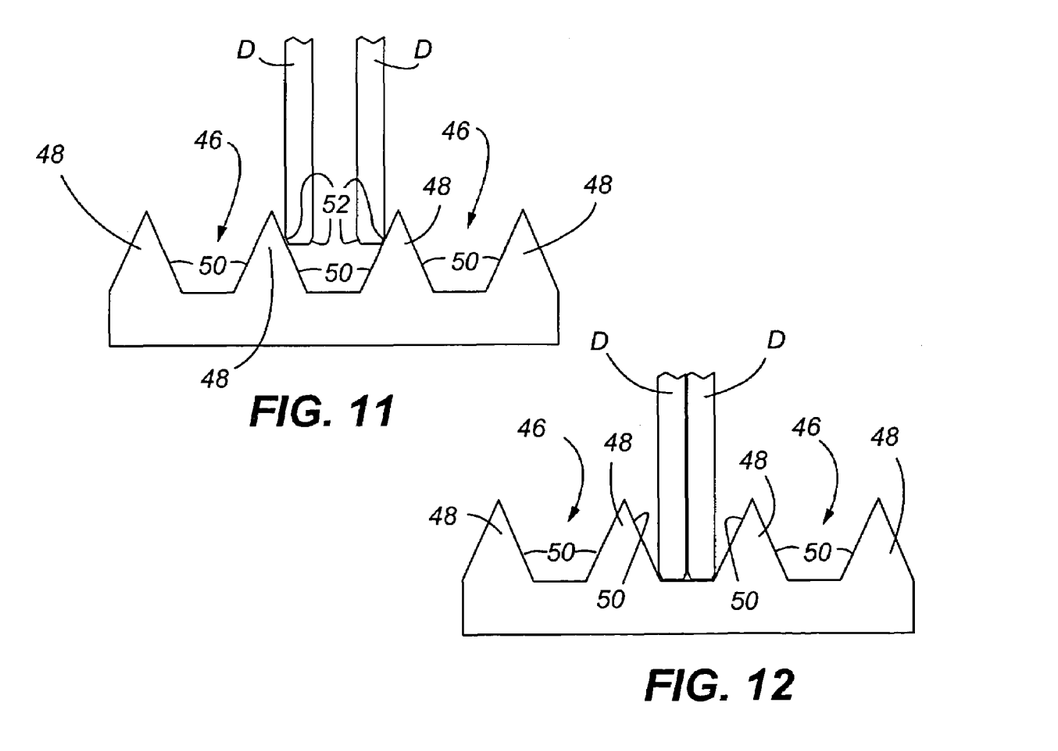
FIG. 11 is a side elevation view of a disk pair engaging a nest or multi-disk merge saddle.
FIG. 12 is a side elevation view of a pair of concentric contact merge disks fully engaged by the nest.
Figure 13:
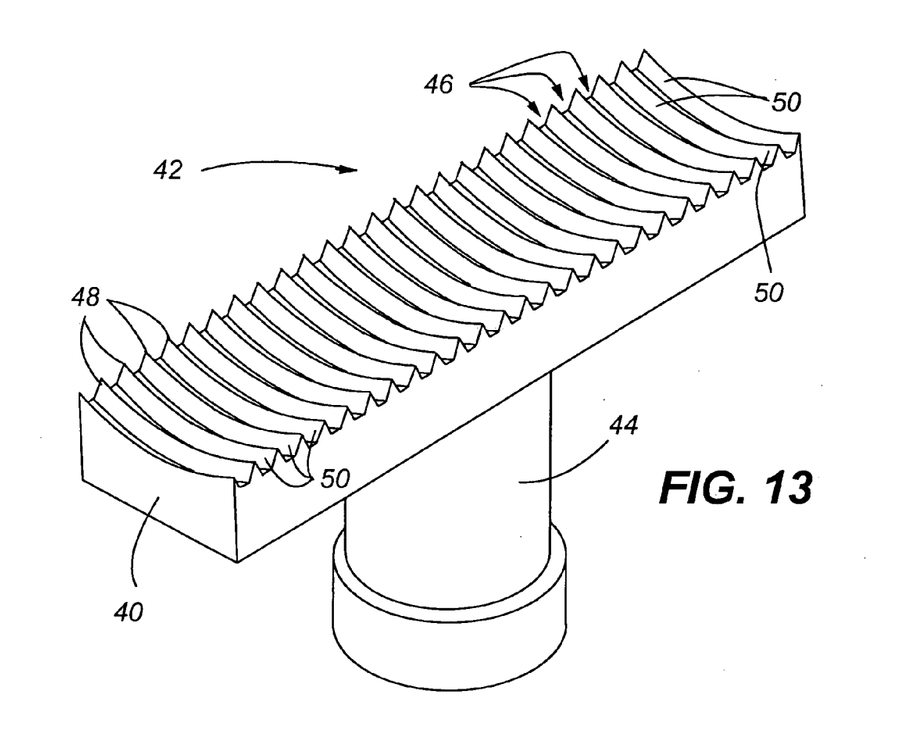
FIG. 13 is a perspective view of one embodiment of the nest of the present invention, configured to facilitate concentric contact merge orientation.
Figure 14:
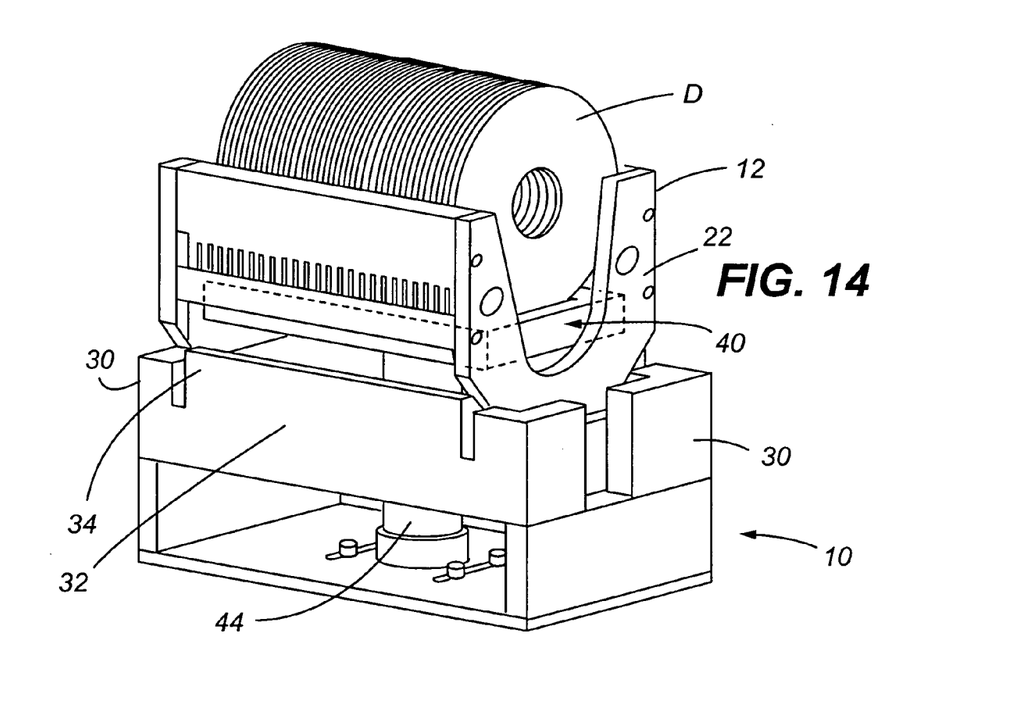
FIG. 14 is a perspective view of the nest of the present invention in an elevated or fixed position where the disks are not fully engaged by the cassette.

The present invention also utilizes a nest or multi-disk merge saddle 40 having an arcuate shaped upper surface 42 to assist in merging the pairs of disks and in seating the disks in a cassette. The nest is shown in FIGS. 5, 6, 13 and 14. The shape of the curved upper surface preferably matches the radius of curvature of the disks. The nest 40 is positioned in the center area of the platform 10 and, in one embodiment, below the open bottom of a cassette seated on the platform. In this same embodiment, the nest 40 is connected to an actuator 44 which moves the nest vertically, through the bottom opening of the cassette, between a first retracted position (FIG. 9) and a second extended position (FIG. 14). Grooves 46 are formed on the upper surface 42 of the nest are dimensioned to support a pair of disks in each groove (FIGS. 5 and 11–13). In addition, the grooves are formed by a row of teeth 48 having angled side walls 50. The angled side walls 50 create a taper to the channel 46 such that each channel is wider at the top than the bottom. If the objective is to create a concentric contact merge between pairs of disks, the width of the bottom of each groove 46 corresponds to the thickness of two disks. In operation, as each pair of spaced disks is lowered onto the nest 40, the side walls 50 of each tooth 48 will force the two disks into contact as they are lowered onto the nest (FIGS. 11, 12). In the preferred embodiment, the angle formed by each pair of side walls 50 will match or be slightly wider than the chamfer formed at the outer perimeter edge 52 of the disks.

Figure 10:
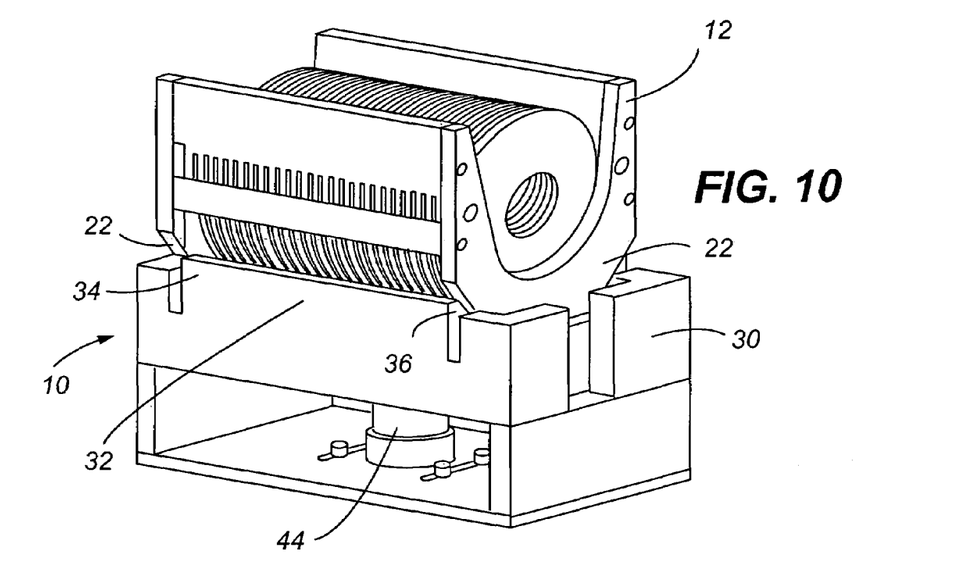
FIG. 10 is a top plan view of the embodiment shown in FIG. 9.

In operation, a mandrel or similar transport device (not shown) delivers a plurality of disks to a cassette 12 seated on platform 10. Initially, the nest will rise through the open bottom of the cassette to a position above the bottom of the cassette. (See, FIG. 14.) As the mandrel lowers the disks, and depending upon the relative position of the nest 40, the disks may contact the nest before contacting the side walls of the cassette, or vice versa. For example, if the nest is relatively high, the disks may contact the nest before contacting the side wall of the cassette or, if the nest is relatively low, the disks may contact the side walls of the cassette first. In the preferred embodiment, the disks will contact the platform first. In either case, the grooves in the nest either initiate the desired merge orientation by causing the lower portion of the disks to merge into the desired orientation or continue the merge process initiated by the similarly configured grooves 20 on the side walls of the cassette. Once the disks are fully engaged by the nest, they should be independently supported in a vertical orientation, allowing the mandrel to disengage. Disks in a contact merge orientation are shown in FIGS. 10 and 12.

In one embodiment, the nest and mandrel are lowered relative to the stationary cassette until such time as the disks engage the grooves 20 on the side walls of the cassette. When the disks are sufficiently stabilized, the mandrel may be removed. Alternatively, once the disks are sufficiently stabilized in the nest but not fully seated in the cassette, such as shown in FIG. 14, the nest may lower without the mandrel until the disks are fully seated in the cassette. In a second embodiment, the nest 40 may remain in an elevated position, or may be permanently fixed in an elevated position. In this case, the disks are not fully seated in the cassette, but are adequately supported to permit removal of the mandrel. When the cassette is lifted off the platform, for example, to transport the cassette to another processing location, the disks become fully seated within the cassette. In either case, the nest facilitates the desired orientation change from the positioning of the disks on the mandrel to the desired positioning in the cassette. When the cassette is lifted off the platform, the disk become fully seated in the cassette.

Figure 8:
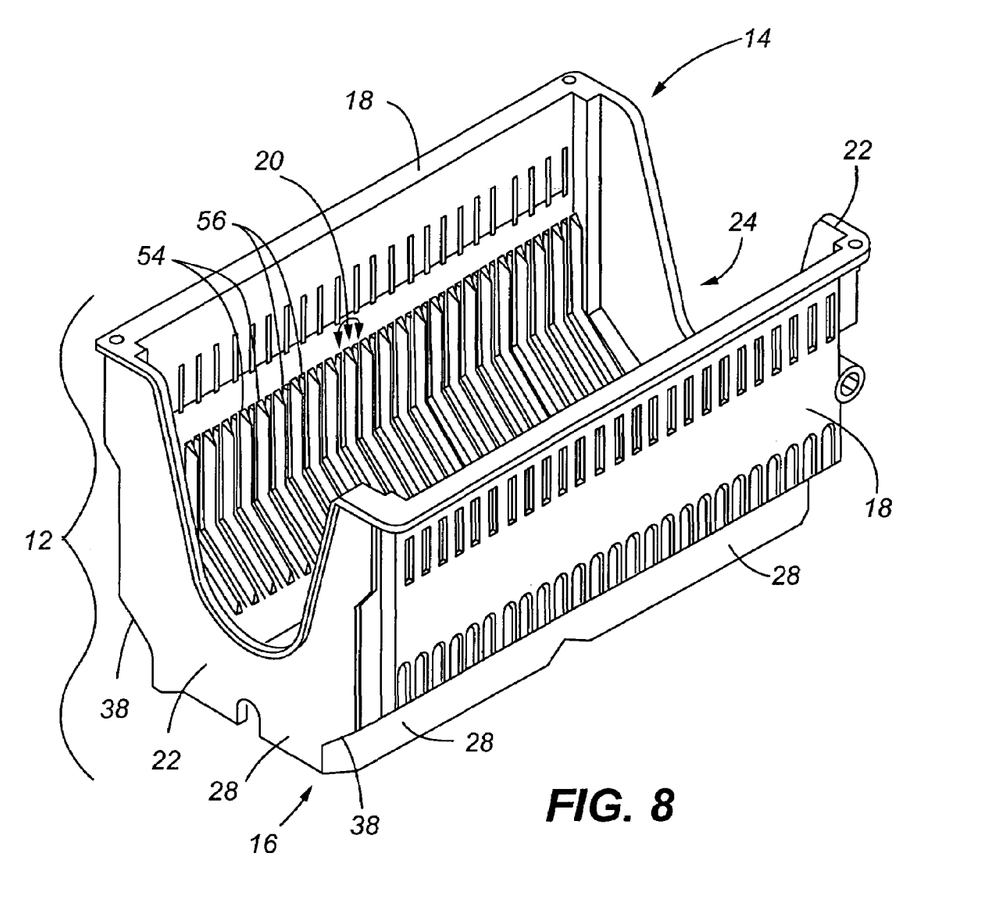
FIG. 8 is a perspective view of a disk cassette configured to position disks in a gap merge orientation.
Figure 15:
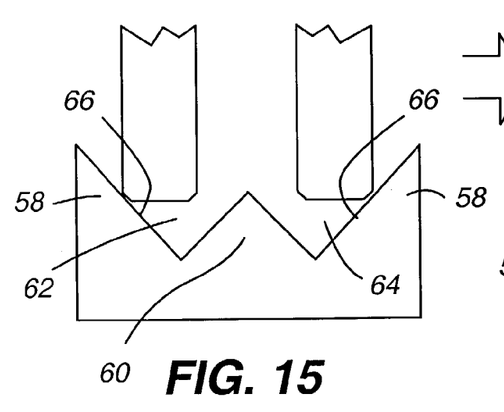
FIG. 15 is a side elevation of a pair of disks engaging an alternative embodiment of the nest.
Figure 16:
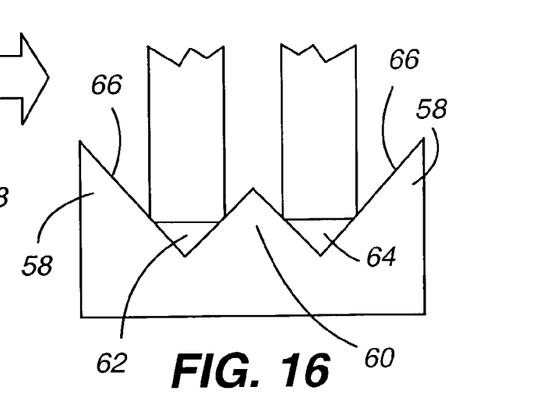
FIG. 16 is a side elevation view of a pair of gap merge disks fully engaged by the nest of FIG. 15.

The present invention may also be utilized to position disks in a gap merge orientation or to alter the size of the gap, such as by repositioning the disks from a first gap merge orientation to a second and different gap merge orientation. In this case, the curved upper portion 42 of the nest will have a configuration similar to that of the side walls of the cassette shown in FIG. 8. The cassette side walls include a row of alternating large teeth 54 and small teeth 56. Thus, the nest 40 will have a pattern of alternating large and small teeth 58 and 60, respectively. The configuration creates two grooves 62, 64 between adjacent large teeth and on opposite sides of the small teeth as shown in FIGS. 15, 16. The disks are positioned relative to the nest such that the large teeth will initially separate disks into pairs as the disks are lowered onto the nest. The side walls 66 of the large teeth will merge the disks into pairs and into a gap merge orientation (FIG. 16). The small teeth 60 will maintain desired separation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing single sided hard disks for use in a hard disk drive, the method comprising:
   a. placing a cassette on a disk merging device, the cassette having an open top, open bottom and open center portion;
   b. providing a nest with a disk contacting portion;
   c. locating said disk contacting portion inside the cassette;
   d. contacting said disk contacting portion with a portion of the perimeter edge of a plurality of spaced apart disks;
   e. reducing the space between at least some of said plurality of disks as a result of said perimeter edge of said plurality of disks contacting said disk contacting portion;
   f. processing the disks.

2. The method of claim 1, wherein locating said disk contacting portion inside the cassette comprises moving the nest from a first retracted position to a second extended position.

3. The method of claim 1, wherein reducing the space between some of the disks comprises forming a plurality of pairs of disks.

4. The method of claim 3, further comprising positioning the pairs of disks in a contact merge orientation.

5. The method of claim 3, further comprising positioning the pairs of disks in a gap merge orientation.

6. The method of claim 3, further comprising forming 25 pairs of disks.

7. The method of claim 1, wherein the plurality of spaced apart disks comprise two disks.

8. The method of claim 1, wherein the plurality of spaced apart disks comprise 50 disks.

9. The method of claim 1, further comprising removing substantially all of the space between some of the disks to form pairs of disks in contact merge orientation.

10. The method of claim 1, further comprising removing the cassette from the disk merging device.

11. The method of claim 10, wherein reducing the space between at least some of said plurality of disks results in a space remaining between said plurality of disks, and wherein removing the cassette from the disk merging device removes the remaining space between at least some of the disks.

12. The method of claim 10, wherein removing the cassette from the disk merging device forms pairs of disks in a contact merge orientation.

13. The method of claim 10, wherein removing the cassette from the disk merging device forms pairs of disks in a gap merge orientation.

14. The method of claim 1, further comprising removing said disk contacting portion from a position inside the cassette to a position outside the cassette.

15. The method of claim 13, further comprising separating adjacent pairs of disks by approximately 0.075 inches.

16. A method of manufacturing single sided hard disks for use in a hard disk drive, the disks having an outer perimeter, comprising:
   a. engaging a plurality of spaced disks with a first merging tool positioned in the interior of a disk receiving cassette, said cassette having side walls defining an interior space of the cassette;
   b. moving a portion of each disk to form pairs of disks in which a portion of the outer perimeter of each disk in a pair is in contact and a space remains between other portions of each disk in a pair;
   c. removing the remaining space between disks in a pair wherein a majority of one surface of each disk in a pair is in contact with a majority of one surface of the other disk in each pair;
   d. performing steps b and c while the disks are at least partially within the interior space of the cassette;
   e. processing the disks.

17. The method of claim 16, wherein removing the remaining space between each disk in a pair comprises placing the pairs of disks in contact merge orientation.

18. The method of claim 16, further comprising engaging the disks with a second merging tool.

19. The method of claim 18, wherein the second merging tool comprises ribs formed on the inside of the cassette side walls.

20. The method of claim 16, further comprising causing relative movement between the first tool and the cassette.

21. The method of claim 20, further comprising moving the first tool.

22. The method of claim 20, further comprising moving the cassette.

23. The method of claim 16, wherein the first merging tool comprises a merge nest.

24. The method of claim 16, wherein the first merging tool comprises ribs formed on the inside walls of the cassette.

25. A method of manufacturing hard disks for use in a disk drive, the disks having an outer perimeter, comprising:
   a. placing a disk carrier adapted to hold a plurality of disks on a nesting station, the carrier having a body defining an internal cavity;
   b. positioning at least a portion of a disk receiving nest in the cavity;
   c. placing a plurality of disks in contact with the nest;
   d. causing relative movement between the nest and carrier;
   e. forming pairs of disks supported by the carrier as a result of the relative movement of the nest and carrier;
   f. processing the disks.

26. The method of claim 25, further comprising forming pairs of disks in gap merge orientation.

27. The method of claim 25, further comprising forming pairs of disks in contact merge orientation.

28. The method of claim 25, further comprising separating adjacent pairs of disks by a space greater than the space between disks of the same pair.

29. The method of claim 25, wherein causing relative movement between the nest and carrier comprises moving the nest to a position below the carrier.

30. The method of claim 25, wherein causing relative movement between the nest and carrier comprises moving the carrier.

31. The method of claim 25, wherein the nest is stationary.

32. The method of claim 25, wherein causing relative movement between the nest and carrier comprises moving the nest.

33. A method of manufacturing hard memory disks for use in a disk drive, the disks having an outer perimeter, comprising:
   a. placing a disk carrier adapted to hold a plurality of disks on a nesting station, the carrier having a body defining an internal cavity;
   b. positioning at least a portion of a disk receiving nest in the cavity;
   c. placing a plurality of disks in contact with the nest;
   d. creating relative movement between the carrier and the nest;
   e. forming pairs of disks in a merge orientation with said pairs of disks supported by the carrier as a result of the relative movement of the nest and carrier;
   f. processing the disks.

34. The method of claim 33, wherein said merge orientation is a gap merge orientation.

35. The method of claim 33, wherein said merge orientation is a contact merge orientation.

36. The method of claim 33, wherein said forming pairs of disks in a merge orientation occurs inside the cassette.

37. The method of claim 33, further comprising moving the carrier to cause the relative movement between the carrier and the nest.

38. The method of claim 33, further comprising moving the nest to cause the relative movement between the carrier and the nest.

* * * * *